(12) United States Patent
Dewan

(10) Patent No.: US 8,107,881 B2
(45) Date of Patent: Jan. 31, 2012

(54) WIRELESS TRANSLATION DEVICE

(75) Inventor: Sunil Dewan, Centennial, CO (US)

(73) Assignee: First Data Corporation, Greenwood Village, CO (US)

( * ) Notice: Subject to any disclaimer, the term of this patent is extended or adjusted under 35 U.S.C. 154(b) by 992 days.

(21) Appl. No.: 12/037,826

(22) Filed: Feb. 26, 2008

(65) Prior Publication Data

US 2009/0215394 A1    Aug. 27, 2009

(51) Int. Cl.
*H04B 7/00*    (2006.01)

(52) U.S. Cl. ...................... 455/41.2; 455/41.3

(58) Field of Classification Search ............ 455/41.2, 455/41.3, 39, 409, 406, 407, 572, 127.1, 455/343.1, 343.6, 13.3, 562.1, 575.7, 279.1; 705/41, 40, 44, 39
See application file for complete search history.

(56) References Cited

U.S. PATENT DOCUMENTS

| | | | |
|---|---|---|---|
| 5,980,322 A | 11/1999 | Madsen et al. | |
| 6,346,346 B1 | 2/2002 | Naskali | |
| 6,978,940 B2 | 12/2005 | Luu | |
| 7,020,486 B2 | 3/2006 | Tanada et al. | |
| 7,243,840 B2 | 7/2007 | Bason et al. | |
| 2002/0156802 A1 | 10/2002 | Takayama et al. | |
| 2003/0055735 A1 | 3/2003 | Cameron et al. | |
| 2004/0235450 A1 | 11/2004 | Rosenberg | |
| 2005/0083177 A1 | 4/2005 | Willgert | |
| 2006/0172701 A1 | 8/2006 | Kienhoefer | |
| 2006/0187052 A1 | 8/2006 | Hung | |
| 2006/0208066 A1 | 9/2006 | Finn et al. | |
| 2007/0152035 A1 | 7/2007 | Adams et al. | |
| 2007/0175972 A1 | 8/2007 | Ringer | |

FOREIGN PATENT DOCUMENTS

WO    WO 2007/044144 A2    4/2007

OTHER PUBLICATIONS

Cybertrust, Bluetooth Security, Mar. 2004, Updated Jun. 2005.
Palm Support, Bluetooth Pairing: Definition and Overview, Solution ID: 14817; www.palmcom; Oct. 2, 2007.
PCT International Search Report and Written Opinion mailed Jan. 13, 2009, Application No. PCT/US2008/080019, 12 pages.
PCT International Search Report and Written Opinion mailed May 14, 2009, International Application No. PCT/US2009/034714, 11 pages.

*Primary Examiner* — Eugene Yun
(74) *Attorney, Agent, or Firm* — Kilpatrick Townsend & Stockton LLP (57) ABSTRACT

A translator for translating wireless communications. The translator includes a first antenna configured to carry signals between the wireless translator and a contactless payment reader, and a second antenna configured to carry signals between the wireless translator and a Bluetooth-enabled device. Circuitry operably coupled to both antennas establishes wireless communication with the contactless payment reader via the first antenna and receives from the contactless payment reader a signal comprising a request for information. The circuitry establishes wireless communication with the Bluetooth-enabled device via the second antenna, and requests the information from the Bluetooth-enabled device. The circuitry receives the information from the Bluetooth-enabled device, and relays the information to the contactless payment reader.

23 Claims, 9 Drawing Sheets

WIRELESS TRANSLATION DEVICE

BACKGROUND OF THE INVENTION

Wireless communication and devices for communicating wirelessly are becoming increasingly popular. Different applications of wireless communication require different wireless communication interfaces, protocols, frequencies, specifications, and standards, so that different devices are required. For example, contactless payment systems allow a user to effect payment for some purchases by tapping or waving a card (or other payment instrument) near a contactless payment reader at a merchant point of sale. These systems provide an alternative to "swiping" a card through a point of sale terminal to read information from a magnetic strip on the card. In a contactless payment system, a microcontroller embedded in the card typically securely holds identifying or payment information, such as the number of an account from which payments are to be made, in a memory. In some systems, when the card is brought within range of the reader, an antenna in the card derives power from a radio signal emanating from the reader, and uses the power to operate an electronic chip on the card. A financial application residing in the microcontroller initiates a sequence of commands to exchange transactional data between the contactless card and the contactless reader. Once the information is verified, a purchase can be approved and finalized very quickly. Some contactless payment systems operate on a carrier frequency of 13.56 MHz.

Another example of a wireless communication application is the interconnection of electronic devices according to the Bluetooth communication standard promulgated by Bluetooth SIG, Inc. In a Bluetooth-enabled system, devices can exchange digital data with each other over distances of a few meters. Typical applications include transmitting audio information between a cellular telephone and an earpiece to enable hands-free operation of the cellular telephone. Bluetooth communications use a frequency-hopping system to transmit on frequencies between 2.40 and 2.4835 GHz. (The cellular telephone as used for its primary purpose of making telephone calls is yet another example of a wireless communication device, using frequencies and protocols different from both contactless payment systems and Bluetooth-enabled devices.)

Bluetooth communications are incompatible with contactless payment readers in several ways, including both frequency and protocol.

BRIEF SUMMARY OF THE INVENTION

In one embodiment, a wireless translator comprises a first antenna configured to carry signals between the wireless translator and a contactless reader, and a second antenna configured to carry signals between the wireless translator and a Bluetooth-enabled device. Circuitry is operably coupled to both antennas and is configured to wirelessly establish communication with the contactless reader via the first antenna, receive from the contactless reader a signal comprising a request for information, wirelessly establish communication with the Bluetooth-enabled device via the second antenna, request and receive the information from the Bluetooth-enabled device, and to relay the information to the contactless reader. In some embodiments, the circuitry is powered by energy derived from the signal from the contactless reader. In some embodiments, the wireless translator further comprises a battery that powers the circuitry. In some embodiments, the translator further comprises a switch having first and second positions such that the circuitry does not draw power from the battery when the switch is in the first position and the circuitry draws power from the battery when the switch is in the second position. In some embodiments, the circuitry is further configured to authenticate the translator to the Bluetooth-enabled device. In some embodiments, authentication is accomplished by validating a digital certificate stored on the translator with a digital certificate stored on the Bluetooth-enabled device. In some embodiments, authentication comprises comparing an identification string supplied to the Bluetooth-enabled device with an identification string stored in the wireless translator. In some embodiments, the circuitry is configured communicate with the contactless reader using an ISO 14443 protocol or an ISO 15693 protocol. In some embodiments, the contactless reader is a contactless payment reader, and the relayed information is payment information used in a contactless payment transaction. In some embodiments, the wireless translator further comprises a generally flat carrier that holds the first and second antennas and the circuitry, and an adhesive on one side of the generally flat carrier. In some embodiments, the carrier, antennas, and circuitry are comprised in a sticker configured to adhere to the Bluetooth-enabled device. In some embodiments, the Bluetooth-enabled device is a cellular telephone, a personal digital assistant, or a portable music player.

In another example embodiment, a method of translating a signal comprises receiving a radio signal from a contactless reader, the signal comprising a request for information. Contact is established with a Bluetooth-enabled device via a Bluetooth interface, and the information is requested and received from the Bluetooth-enabled device via the Bluetooth interface. The information is relayed to the contactless reader. In some embodiments, the information is payment information requested at a point of sale. In some embodiments, the information is identification information requested by an access control system. In some embodiments, the method further comprises requiring and receiving authorization from a user of the Bluetooth-enabled device before divulging the information from the Bluetooth-enabled device.

In another example embodiment, a system for providing information to a contactless reader comprises a Bluetooth-enabled device and a wireless translator. The wireless translator is configured to receive a radio signal from a contactless reader. The radio signal comprises a request for information. The translator is also configured to request and receive the information from the Bluetooth-enabled device via a Bluetooth interface, and to relay the information to the contactless reader. In some embodiments, the wireless translator is affixed to the Bluetooth-enabled device. In some embodiments, the wireless translator is inside the Bluetooth-enabled device. In some embodiments, the wireless translator comprises circuitry for performing radio communication, and a battery electrically connected to the circuitry and supplying power to the circuitry. In some embodiments, the wireless translator further comprises a switch having two positions, wherein when the switch is in the first position the circuitry does not draw power from the battery and when the switch is in the second position the circuitry draws power from the battery.

In another example embodiment, a system comprises a contactless reader, a Bluetooth-enabled device, and a wireless translator. The wireless translator comprises a first antenna configured for communication with the contactless reader, and second antenna configured for communication with the Bluetooth-enabled device via a Bluetooth interface, and circuitry operably coupled to both antennas. The circuitry is configured to translate an information request from the contactless payment reader to the Bluetooth-enabled device, to receive the requested information from the Bluetooth-enabled device via the Bluetooth interface, and to relay the information to the contactless reader. In some embodiments, the contactless reader is comprised in an access control system, and the requested information is identification information enabling access.

In another example embodiment, a method of making a contactless payment at a point of sale comprises obtaining a Bluetooth-enabled device, provisioning the Bluetooth-enabled device with purchasing credentials, and obtaining a wireless translator. The wireless translator comprises a first antenna configured for communication with a contactless payment reader, a second antenna configured for communication with the Bluetooth-enabled device via a Bluetooth interface, and circuitry operably coupled to both antennas. The circuitry is configured to translate information requests from the contactless payment reader to the Bluetooth-enabled device. The method further comprises bringing the wireless translator within Bluetooth communication range of the Bluetooth-enabled device, and bringing the wireless translator within operating range of the contactless reader. In some embodiments, the Bluetooth-enabled device comprises a mobile wallet holding purchasing credentials for more than one account, and the method further comprises selecting, using a user interface on the Bluetooth-enabled device, an account from which to make the payment. In some embodiments, the method further comprises authorizing the payment.

DETAILED DESCRIPTION OF THE INVENTION

The present invention relates generally to a device that translates one form of wireless communication to another. In one specific embodiment, the translator enables use of a Bluetooth-enabled device to exchange information with a contactless reader. In one application, this enables a user of a Bluetooth-enabled cellular telephone or other kind of Bluetooth-enabled portable electronic device to use the device to make payments through a contactless reader at a point of sale. In other applications, this enables a user of a Bluetooth-enabled device to provide identification or authentication information through a contactless reader, for example to gain entrance to a building, to access medical records, or for another purpose.

Figure 1:
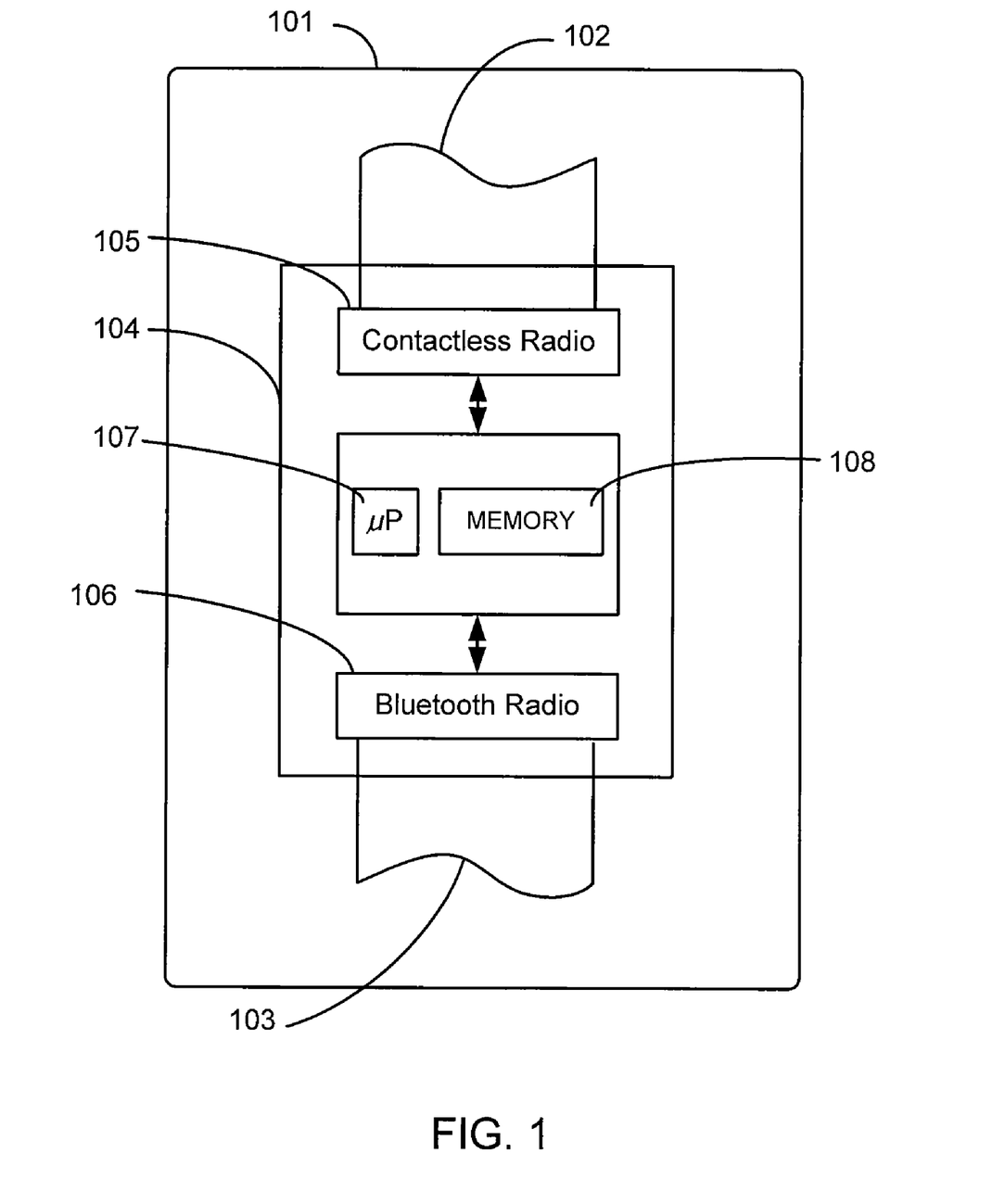
FIG. 1 shows a wireless translator, in accordance with an example embodiment of the invention.

FIG. 1 shows a wireless translator 101, in accordance with an example embodiment of the invention. Wireless translator 101 comprises a first antenna 102, configured to carry signals between wireless translator 101 and a contactless reader. In one example embodiment, antenna 102 is optimized for transmission and reception of signals at 13.56 MHz, a common frequency for operation of contactless payment systems and radio frequency identification (RFID) systems, although other frequencies are possible. For example, some RFID systems operate at lower frequencies, higher frequencies, or multiple frequencies. Wireless translator 101 also comprises second antenna 103 configured to carry signals between wireless translator 101 and a Bluetooth-enabled device. Preferably, antenna 103 is optimized for transmission and reception of signals between 2.40 and 2.4835 GHz.

Both antennas 102 and 103 are operably coupled to circuitry 104. Circuitry 104 further comprises a first radio 105, which transmits and receives wirelessly over antenna 102, and a second radio 106, which transmits and receives wirelessly over antenna 103. Power for circuitry 104 may be derived from a radio signal received by one of the antennas 102 or 103. Power and ground connections are omitted from FIG. 1 for simplicity of illustration, and connections between components represented as single lines in FIG. 1 may in fact include multiple connections.

Circuitry 104 also comprises a microprocessor 107 and memory 108. Microprocessor 107 may be, for example an embedded ARM-7 microprocessor, available from Arm Holdings Plc. of Cambridge, England. Memory 108 may comprise various forms of volatile and non-volatile memory, including random access memory (RAM), read only memory (ROM), electrically erasable programmable read only memory (EEPROM), flash memory, other kinds of memory, of any of these in any combination. Some or all of memory 108 may be integrated into microprocessor 107. Memory 108 holds instructions for microprocessor 107 and data, including data used for authenticating wireless translator 101. Microprocessor 107, under control of the instructions stored in memory 108, controls the operation of wireless translator 101, and can communicate with a contactless reader over radio 105, and also with a Bluetooth-enabled device over radio 103. In other words, translator 101 communicates with the Bluetooth-enabled device via a Bluetooth interface.

A Bluetooth core design embeddable in application specific integrated circuits (ASICs) and other designs is available from NewLogic Technologies of Lustenau, Switzerland. An example of a chip that provides the functionality needed for a contactless payment device, powered from the radio signal emanated by a contactless reader, is the model SR1512 13.56 MHz short-range contactless memory chip with 512-bit EEPROM and anticollision functions, available from ST Microelectronics of Geneva, Switzerland.

Figure 2:
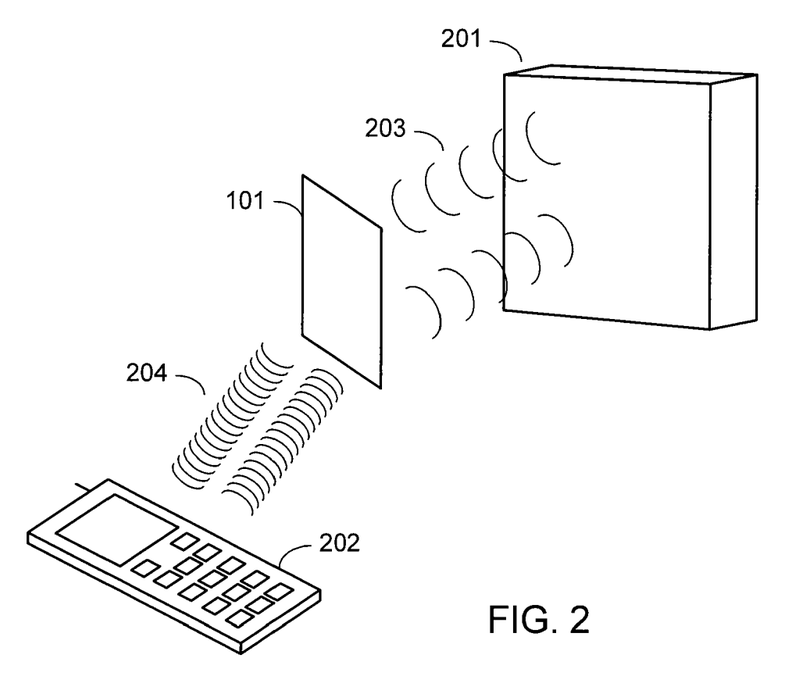
FIG. 2 shows the relationship between a contactless reader, a wireless translator, and a Bluetooth-enabled electronic device, in accordance with an example embodiment of the invention.

Wireless translator 101 acts as a translator or bridge between a contactless reader and a Bluetooth-enabled device. FIG. 2 shows the relationship between a contactless reader 201, wireless translator 101, and a Bluetooth-enabled electronic device 202, which in this example is a cellular telephone. In other embodiments, Bluetooth-enabled electronic device may be, for example, a personal digital assistant, a music player, a combination device that can perform multiple functions, or another kind of device. In an example operation, wireless translator 101 is brought within operating range of contactless reader 201, typically within a few inches. Wireless translator 101 is also near enough to Bluetooth-enabled device 202 that Bluetooth communication can occur, typically within a few meters. Contactless reader 201 emanates radio frequency (RF) signal 203. Preferably, wireless translator 101 gathers power from RF signal 203, and becomes active. Alternatively, wireless translator 101 may be powered by a battery, as will be explained in more detail later. Wireless translator 101 recognizes that contactless reader 201 is requesting transactional information, for example as for a purchase at a merchant point of sale. Wireless translator 101 contacts Bluetooth-enabled device 202, using signals 204. Preferably, wireless translator 101 and Bluetooth-enabled device 202 have a pre-established trusted relationship, as will be explained in more detail later. Wireless translator 101 then requests the information from Bluetooth-enabled device 202, which transmits the information to wireless translator 101 via the Bluetooth interface. Wireless translator 101 relays the information to contactless reader 201, where the information may be used by a point of sale system to obtain transaction approval, or for another purpose.

Preferably, wireless translator 101 is configured to communicate with contactless reader 201 using signals and protocols defined in International Organization for Standardization (ISO) standard 14443 or ISO standard 15693, although signals and protocols defined by other standards are possible. Alternatively, wireless translator 101 may be used in a proprietary system using non-standard signals, protocols, or both.

Figure 3A:
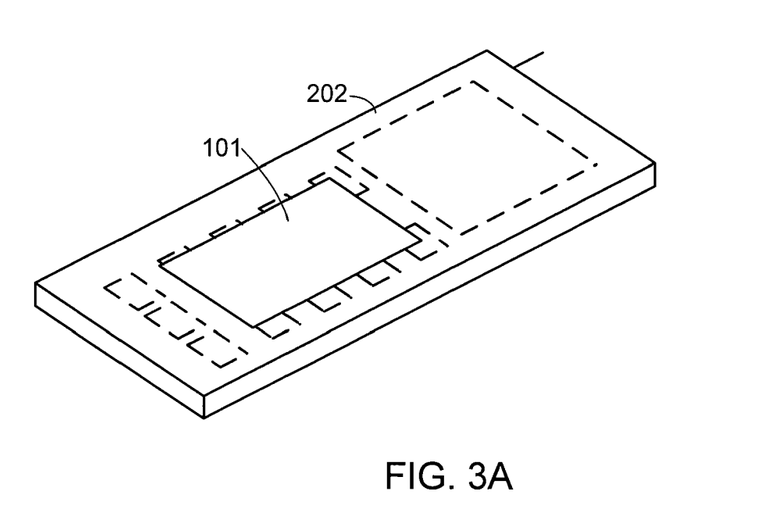
FIGS. 3A, 3B, and 3C show wireless translators adhered to Bluetooth-enabled devices, in accordance with example embodiments of the invention.
Figure 3B:
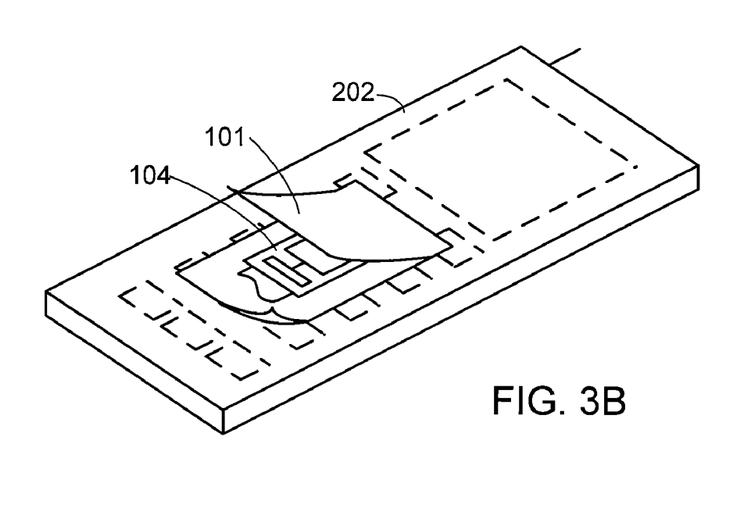
Figure 3C:
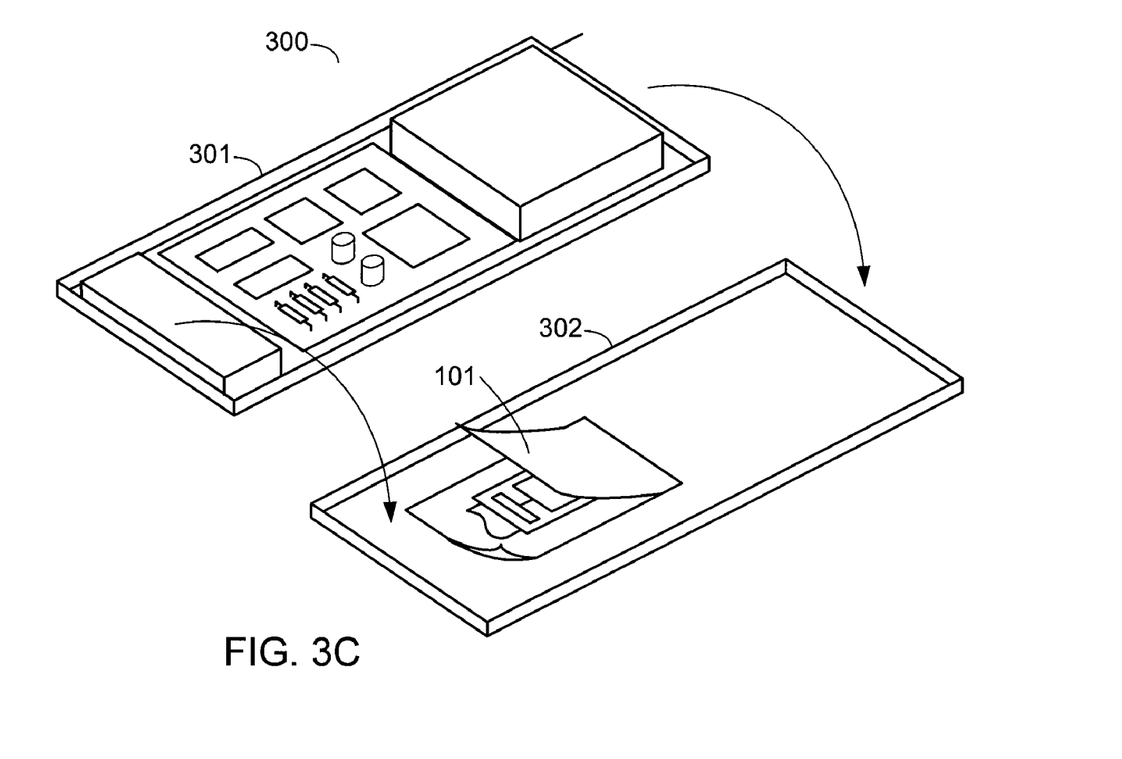

Conveniently, wireless translator 101 may be packaged in the form of an adhesive sticker that can be affixed to Bluetooth-enabled device 202. In this embodiment, antennas 102 and 103 and circuitry 104 are held in relationship by a thin carrier. For example, the components may be laminated in a carrier made up of plastic sheets secured together by adhesive. The carrier may also comprise a layer of adhesive on one outside face, so that the carrier can be adhered to the outside of Bluetooth-enabled device 202. FIGS. 3A and 3B show an example of this embodiment. In FIG. 3A, wireless translator 101 is shown adhered to the back side of Bluetooth-enabled device 202. In FIG. 3B, wireless translator 101 is shown adhered to the back side of Bluetooth-enabled device 202 and partially delaminated to show its structure, including circuitry 104. Having wireless translator 101 attached to Bluetooth-enabled device 202 keeps the two items in close proximity, and therefore always within communication range. Also, the number of separate items that a user may need to carry is reduced. Because example Bluetooth-enabled device 202 and translator 101 can effectively function as a payment instrument, the user need not carry a separate payment instrument. FIG. 3C shows an alternative attachment of a wireless translator 101 to a Bluetooth-enabled device. In FIG. 3C, Bluetooth-enabled device 300 has been opened. Front portion 301 may comprise various circuitry, a battery, a display, or other components. Back cover 302 is a shell for enclosing the internal components of device 300. Wireless translator 101 is shown adhered to the inside of back cover 302 (and partially delaminated to show the internal makeup of wireless translator 101). Many other mounting arrangements are possible, depending on the architecture of the Bluetooth-enabled device with which wireless translator 101 is used. For example, wireless translator 101 may be embedded in part of a housing or cover comprised in a Bluetooth-enabled device.

Before using Bluetooth-enabled device 202 as a payment instrument, the payment information requested by contactless reader is loaded onto Bluetooth-enabled device 202 in a process known as "provisioning". Provisioning may be accomplished in any of a variety of ways.

Figure 4:
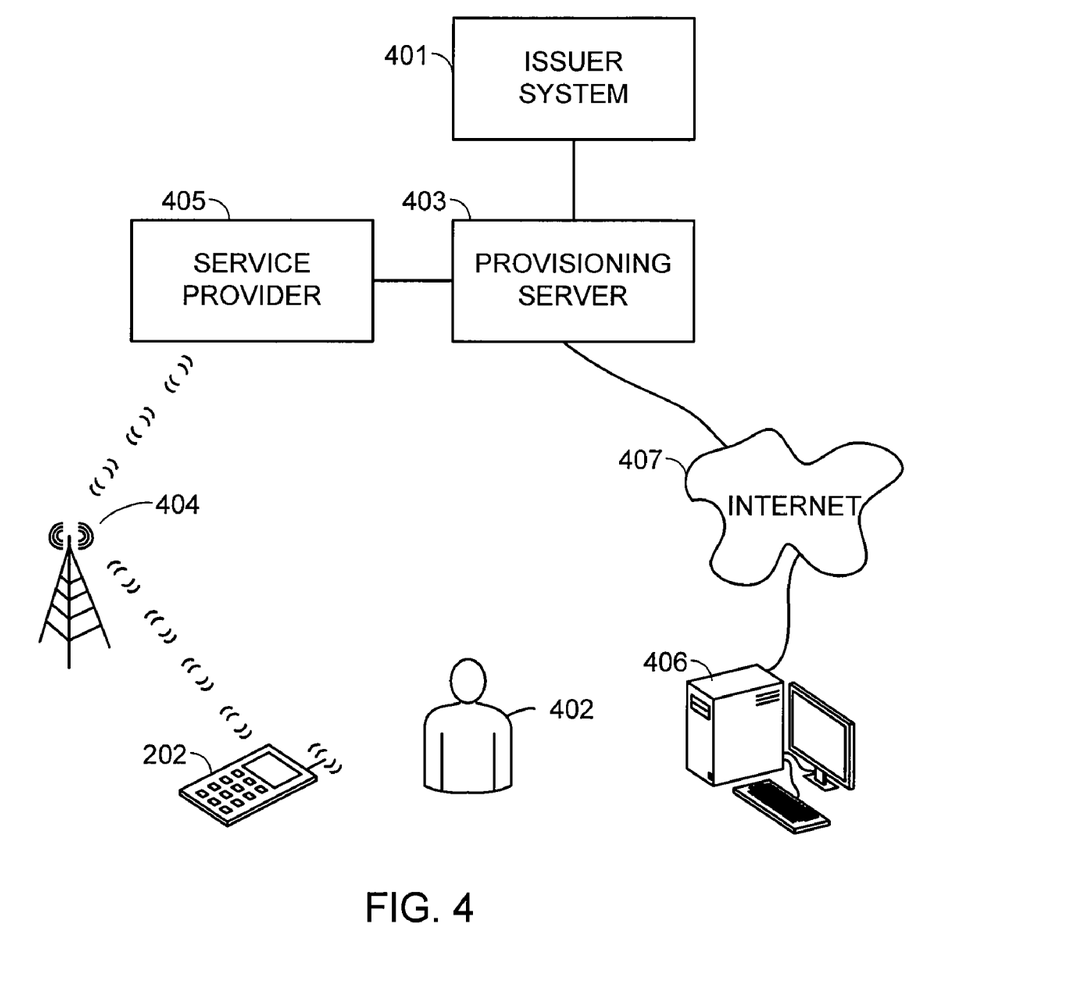
FIG. 4 shows an example of a system for over-the-air provisioning.

One method of provisioning is known as "over-the-air" (OTA) provisioning. A system for OTA provisioning is shown in FIG. 4. In the example system of FIG. 4, an issuer system 401 is operated by an issuer of a credit, debit, stored value, or other account that consumer 402 wishes to make payments from using Bluetooth-enabled mobile device 202. Alternatively, issuer system 401 may be operated by another entity on behalf of one or more issuers. Issuer system 401 communicates with provisioning server 403. Provisioning server 403 may also be called a mobile wallet server. Provisioning server 403 is configured to distribute purchasing credentials, such as account information suitable for use at a contactless reader station. Upon proper authentication of consumer 402, provisioning server 403 sends purchasing credentials to Bluetooth-enabled mobile device 202 over a wireless communication network, represented by tower 404. The wireless communication network may be operated by a service provider 405, which may be, for example, a wireless telephone company. In one method of OTA provisioning, consumer 402 accesses provisioning server directly from mobile device 202, which may be enabled with a web browser or other communication interface. Alternatively, consumer 402 accesses provisioning server 403 using a personal computer 406 communicating with provisioning server 403 through the Internet 407. In this alternative arrangement, once consumer 402 is properly authenticated and has supplied contact information for mobile device 202, the purchasing credentials are sent over the wireless network to mobile device 202.

Figure 5:
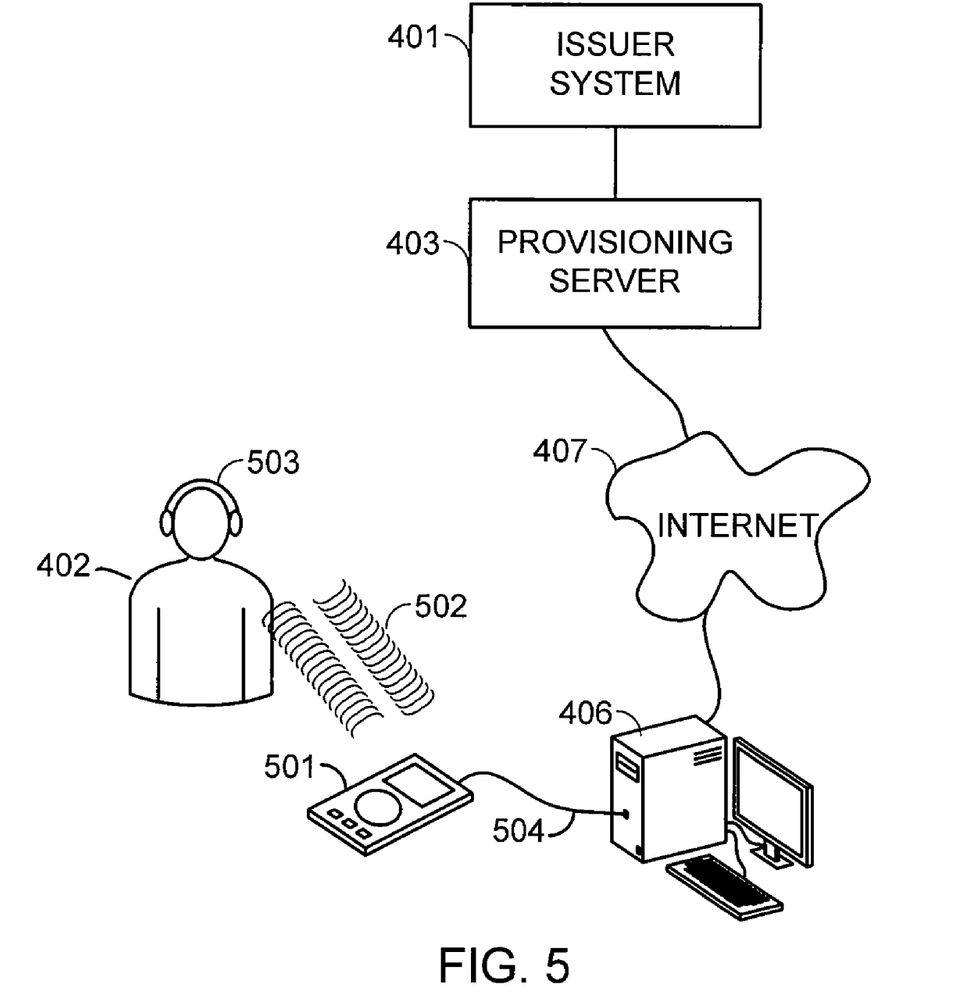
FIG. 5 shows example way of provisioning a Bluetooth-enabled mobile device.

FIG. 5 shows another example way of provisioning a Bluetooth-enabled mobile device. In this example, Bluetooth-enabled mobile device 501 is an MP3 portable music player that uses Bluetooth to communicate 502 with wireless headphones 503. Because mobile device 501 is not configured to communicate through a wireless telephone network, over-the-air provisioning is not available. In the example of FIG. 5, mobile device 501 is connected to computer 406 through a cable 504, which may be a universal serial bus (USB) cable or another kind of cable. Purchasing credentials are obtained from provisioning server 403 over the Internet 407 and downloaded to mobile device 501 through cable 504, which can then be disconnected to allow portable use of mobile device 501.

Alternatively, a purchasing credentials may be supplied to consumer 402 in print, by electronic mail, or by another means, and consumer 402 may simply key the credentials into a Bluetooth-enabled mobile device to be used as a payment instrument. Other methods of provisioning a mobile device may be envisioned.

During provisioning, provisioning server 403 may download a "mobile wallet" to the mobile device being provisioned. A mobile wallet includes an application program and data structures to store and access purchasing credentials. Credentials for more than one account may be held in a mobile wallet. More detail about provisioning a device for mobile commerce may be found in pending U.S. patent application Ser. No. 11/830,420 of Arthur et al. and entitled "Provisioning of a device for mobile commerce", the entire disclosure of which is incorporated by reference herein.

One or more security measures may be implemented to prevent or discourage illicit use of wireless translator 101 and its associated Bluetooth-enabled mobile device.

One security measure that may be taken is to "pair" or "bond" wireless translator 101 to the mobile device with which it will be used. In the Bluetooth system, pairing two devices creates a trusted relationship between them. That is, once authenticated and paired, the two devices will communicate freely without further user involvement in authentication. Ordinarily, users of two self-powered Bluetooth devices with keypads pair the devices by agreeing on a passcode or identification string (which may be simply a number), having the two devices locate each other, and keying the identification string into both devices. Once the devices recognize that they have each received the same passcode, they form a trusted pair. In the case of wireless translator 101, the device may not be self-powered, and also does not have a keypad. A password or number may be permanently assigned to translation device 101 at the time of its manufacture. For example, the passcode or identification string may be stored in memory 108, and may be encrypted for additional security. This technique is used for other Bluetooth devices that lack keypads or other user interfaces, for example printers, headsets, and the like. During pairing, the permanent passcode is keyed into the other device, for example Bluetooth-enabled device 202, and the pairing proceeds.

Preferably, each unit of wireless translator 101 has a unique or nearly-unique passcode, which is distributed to the purchaser of the device when the device is purchased. For example, the passcode may be printed in a user manual, mailed to the purchaser, or sent to the purchaser by electronic mail. In one example embodiment, the passcode is printed on a removable sticker affixed to the device. Once pairing has occurred, the passcode sticker may be removed so that the passcode is kept secret. The sticker may be destroyed.

Figure 6:
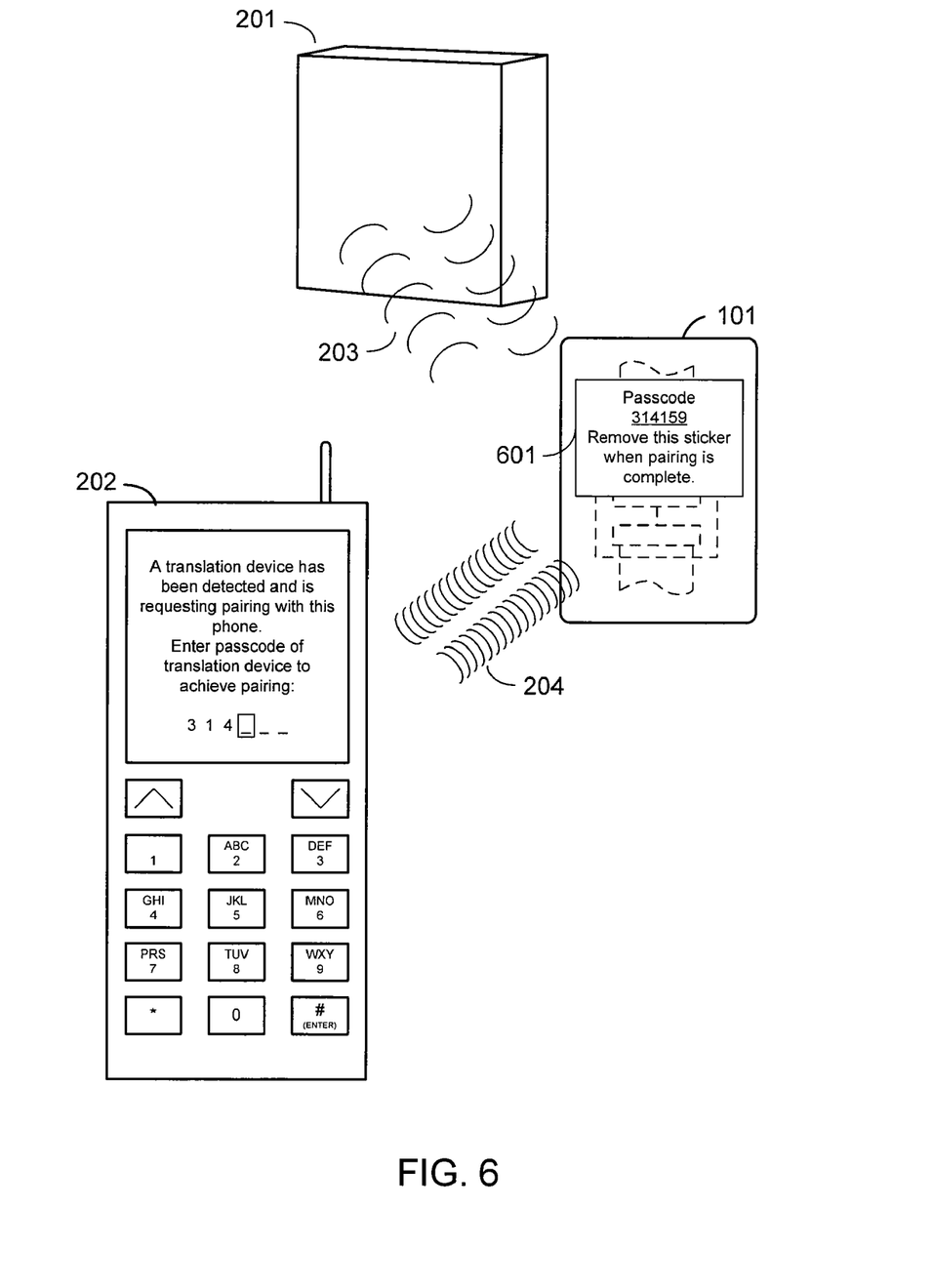
FIG. 6 shows a Bluetooth-enabled device and a wireless translator as they may appear when first brought within range of a contactless reader, in accordance with an example embodiment of the invention.

In one example embodiment, pairing occurs on the first use of wireless translator 101, when the device is first brought to life by being placed within range of a contactless reader. FIG. 6 shows Bluetooth-enabled device 202 and wireless translator 101 as they may appear when first brought within range of contactless reader 201. Contactless reader 201 emanates radio signals 203, which power wireless translator 101. Wireless translator 101 awakes, and searches for other Bluetooth devices in range, finding Bluetooth-enabled mobile device 202 using Bluetooth signals 204. Wireless translator 101 requests pairing with mobile device 202. The user of mobile device 202 keys the passcode from sticker 601 into mobile device 202, and the devices are paired. Preferably, the user removes sticker 601, and affixes wireless translator 101 to Bluetooth-enabled device 202.

In another example embodiment, pairing may be accomplished at a special station that powers wireless translator 101 using a radio signal, but is not a contactless reader. For example, a station may be configured in a retail location where wireless translator 101 is sold. A consumer purchasing wireless translator 101 may pair it with his or her mobile Bluetooth device at the time of purchase, and can make his or her first purchase using wireless translator 101 without undue delay.

Another level of security may be attained by requiring authorization at each use of the mobile device as a payment instrument. For the purposes of this disclosure, authorization is permission, given by a person with authority to do so, for an action to occur. Authorization is different from authentication. Authentication is the verification that a person or device is who or what it purports to be. For wireless translator 101 and mobile device 202, preferably authentication occurs at the time the devices are paired. Authorization may optionally occur at each transaction. Authorization may be required, for example, by using a Bluetooth service running on mobile device 202 to respond to requests from translator 101, and setting the service so that authorization is required. Alternatively, the mobile wallet application running on mobile device 202 may require authorization at each purchase.

Figure 7:
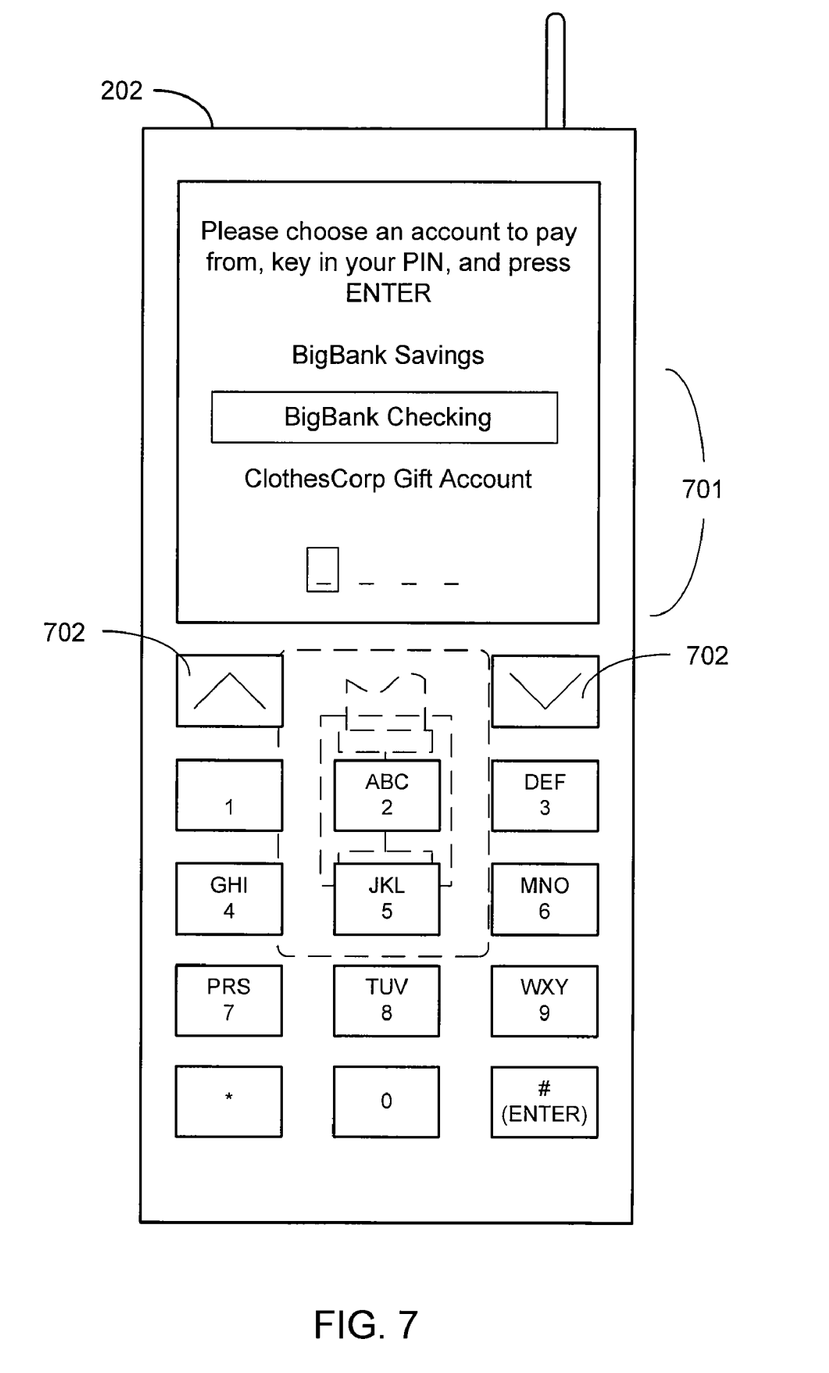
FIG. 7 shows a user interface of a mobile wallet application, in accordance with an example embodiment of the invention.

FIG. 7 shows a user interface 701 of a mobile wallet application running on Bluetooth-enabled device 202, which has translator 101 affixed to its back side. In this example, the mobile wallet holds purchasing credentials for three different accounts—a bank savings account, a bank checking account, and a gift account with a particular merchant. The consumer using device 202 can, using arrow keys 702, scroll through the accounts and select one from which to pay. The consumer then keys in the appropriate personal identification number (PIN), which is required (in this example) before the mobile wallet application will divulge the purchasing credentials to wireless translator 101, which in turn presents them to a contactless reader.

Alternatively, the mobile wallet application may be configured to pay by default from a particular account without requiring a passcode or PIN. For example, an account PIN required for a debit card transaction may be stored in mobile device 202 and automatically passed to contactless reader 201 during the transaction. In this configuration, payments may be made very quickly and conveniently, although with some increased risk of loss if mobile device 202 is lost or stolen.

Figure 8:
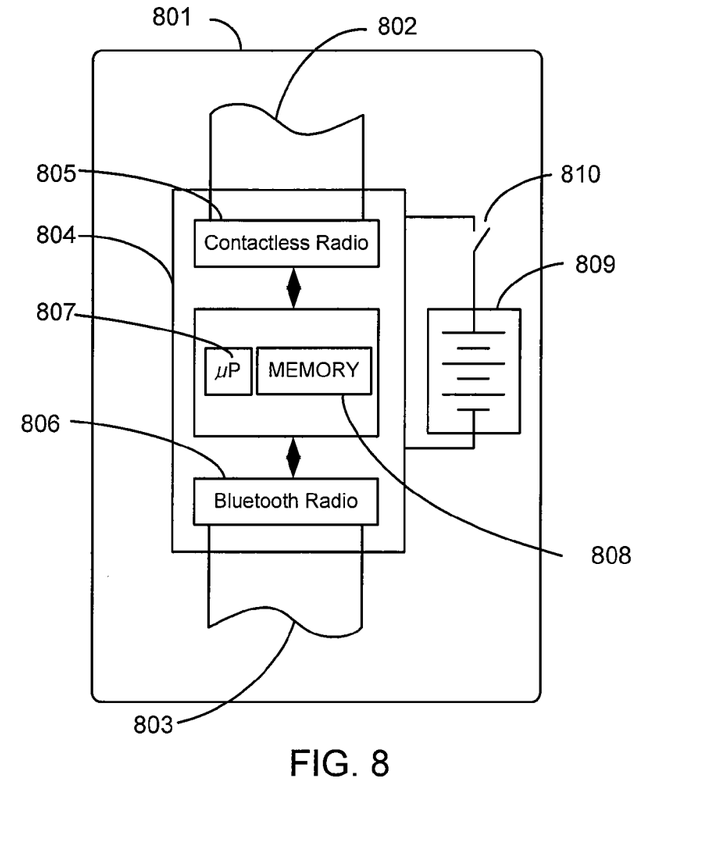
FIG. 8 shows a wireless translator in accordance with another example embodiment of the invention.

FIG. 8 shows a wireless translator 801 in accordance with another example embodiment of the invention. In the example of FIG. 8, wireless translator 801 comprises a first antenna 802, configured to carry signals between wireless translator 801 and a contactless payment reader. Wireless translator 801 also comprises second antenna 803 configured to carry signals between wireless translator 801 and a Bluetooth-enabled device. Wireless translator 801 further comprises circuitry 804, including contactless radio 805, Bluetooth radio 806, microprocessor 807, and memory 808.

Wireless translator 801 further comprises a battery 809, for supplying power to circuitry 804. Battery 809 is preferably a lithium-ion battery with a nominal output voltage of about 3.3 volts, but many other battery types and voltages are possible. Because battery 809 is included, wireless translator 801 need not rely on a radio signal for obtaining power. Because power is readily available, wireless translator 801 may have a greater operational range when communicating wirelessly with a contactless reader or a Bluetooth-enabled device. Furthermore, authentication and pairing of wireless translator 801 with a Bluetooth device may be accomplished using battery power at the user's convenience, and need not be done upon the first use of the system or at a special station. Optional switch 810 is preferably normally open, so that circuitry 804 does not draw power from battery 809 until switch 810 is closed. In this way, the energy stored in battery 809 is conserved.

Preferably, battery 809 has a thin, generally planar shape, so as to add little or no thickness to wireless translator 801. U.S. Pat. No. 6,346,346 to Naskali and entitled "Flexible battery structure" describes a thin, flexible battery. The entire disclosure of that patent is incorporated by reference herein. Switch 810 is preferably a momentary membrane switch. Various possible example configurations for switch 810 are described in U.S. Pat. No. 6,863,220 to Selker and entitled "Manually operated switch for enabling and disabling an RFID card", the entire disclosure of which is incorporated by reference herein.

Figure 9:
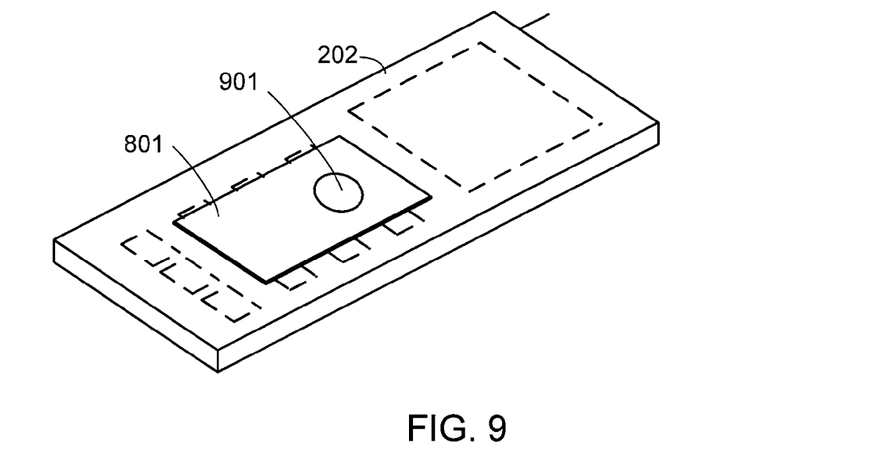
FIG. 9 shows wireless translator affixed to the back of a Bluetooth-enabled mobile device, in accordance with an example embodiment of the invention.

FIG. 9 shows wireless translator 801 affixed to the back of Bluetooth-enabled device 202, in accordance with an example embodiment of the invention. Button 901 actuates switch 810. Button 901 is positioned so that the user of the system can conveniently press the button to wake wireless translator 801 and make a contactless payment.

Figure 10:
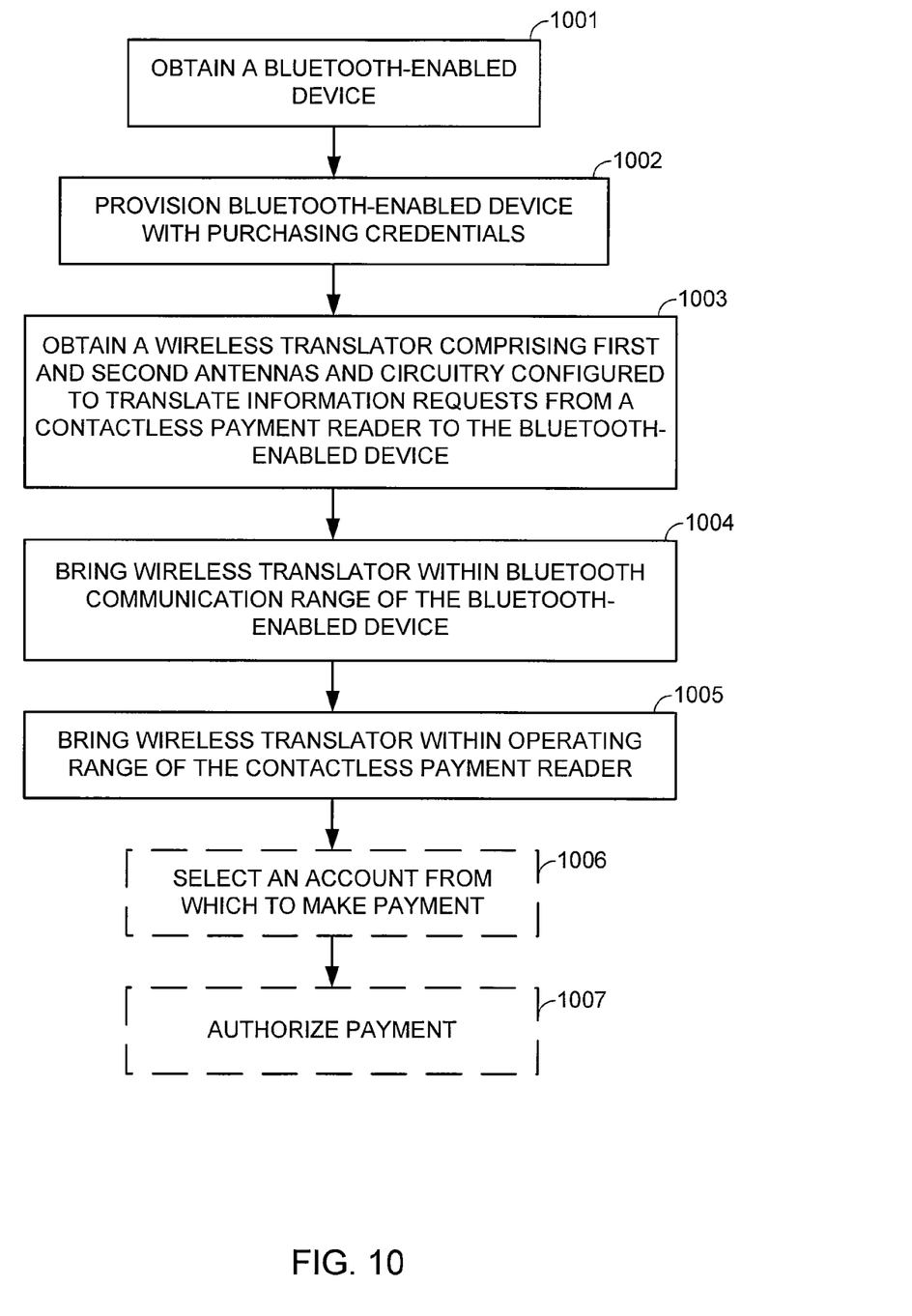
FIG. 10 shows a flowchart of a method in accordance with an example embodiment of the invention.

FIG. 10 shows a flowchart of a method in accordance with an example embodiment of the invention. In step 1001, a Bluetooth-enabled device is obtained. In step 1002, the Bluetooth-enabled device is provisioned with payment credentials. In step 1003, a wireless translator is obtained. The wireless translator comprises first and second antennas and circuitry configured to translate information requests from a contactless payment reader to the Bluetooth-enabled device. In step 1004, the wireless translator is brought within Bluetooth communication range of the Bluetooth-enabled device. In step 1005, the wireless translator is also brought within operating range of the contactless payment reader. In step 1006, which is indicated as optional by dashed lines enclosing the block representing the step, an account is selected from which to make payment. In optional step 1007, the payment is authorized.

While the invention has thus far been explained mainly in the context of payment systems, other applications are possible. For example, in accordance with another embodiment of the invention, a wireless translator such as wireless translator 101 may enable a Bluetooth-enabled device to provide identification information for various purposes.

Radio frequency contactless readers are often used to control access to secured areas, including to buildings. In a typical system, each person authorized to enter a building carries a card encoded with a unique identification code. A contactless reader at each entrance emanates radio frequency signals. When a card is presented to a reader at an entrance, the reader reads the code from the card, and a system compares the code with a list of authorized entry codes. If the code is on the list, the system opens or unlocks the door. These systems use technology similar to contactless payment systems, and suffer the same drawbacks. For example, the entry card is but one more item each authorized entrant must carry. According to an example embodiment of the invention, a user's entry code is provisioned to a Bluetooth-enabled device, and a wireless translator translates the signals from the contactless reader to the Bluetooth-enabled device and relays the code from the Bluetooth-enabled device to the contactless reader of the access control system. Because an entrant can use his or her Bluetooth-enabled device to gain authorized entry, it is unnecessary to carry an access card.

Other access control systems may operate similarly, and embodiments of the invention may be used with those systems as well. For example, a system comprising a contactless reader may be used to control access to a cabinet containing medical supplies, to a controlled inventory area in a factory, or to other areas. Similarly, a transit system may use a contactless reader to detect a rider entering the system, so that the rider's prepaid account can be conveniently charged for a fare. In some areas, such prepaid accounts can be used to make other small purchases as well.

The invention has now been described in detail for the purposes of clarity and understanding. However, those skilled in the art will appreciate that certain changes and modifications may be practiced within the scope of the appended claims.

What is claimed is:

1. A wireless translator for translating wireless communications, the translator comprising:
   a first antenna configured to carry signals between the wireless translator and a contactless reader;
   a second antenna configured to carry signals between the wireless translator and a Bluetooth-enabled device; and
   circuitry operably coupled to both antennas, the circuitry configured to establish wireless communication with the contactless reader via the first antenna;
   receive from the contactless reader a signal comprising a request for information;
   establish wireless communication with the Bluetooth-enabled device via the second antenna;
   request the information from the Bluetooth-enabled device;
   receive the information from the Bluetooth-enabled device; and
   relay the information to the contactless reader.

2. The wireless translator of claim 1, wherein the circuitry is powered by energy derived from the signal from the contactless reader.

3. The wireless translator of claim 1, further comprising a battery, and wherein the circuitry is powered by the battery.

4. The wireless translator of claim 3, further comprising a switch having first and second positions such that the circuitry does not draw power from the battery when the switch is in the first position, and the circuitry draws power from the battery when the switch is in the second position.

5. The wireless translator of claim 1, wherein the circuitry is further configured to authenticate the translator to the Bluetooth-enabled device.

6. The wireless translator of claim 5, wherein authenticating the translator comprises validating a digital certificate stored on the translator with a digital certificate stored on the Bluetooth-enabled device.

7. The wireless translator of claim 5, wherein authenticating the translator comprises comparing an identification string supplied to the Bluetooth-enabled device with an identification string stored in the wireless translator.

8. The wireless translator of claim 1, wherein the circuitry is further configured to communicate with the contactless reader using an ISO 14443 protocol or an ISO 15693 protocol.

9. The wireless translator of claim 1, wherein the contactless reader is a contactless payment reader, and the relayed information is payment information used in a contactless payment transaction.

10. The wireless translator of claim 1, further comprising:
    a generally flat carrier that holds the first and second antennas and the circuitry; and
    an adhesive on one side of the generally flat carrier.

11. The wireless translator of claim 10, wherein the carrier, antennas, and circuitry are comprised in a sticker configured to adhere to the Bluetooth-enabled device.

12. The wireless translator of claim 1, wherein the Bluetooth-enabled device is a cellular telephone, a personal digital assistant, or a portable music player.

13. A method of translating a signal, comprising:
    receiving a radio signal from a contactless reader, the signal comprising a request for information;
    establishing contact with a Bluetooth-enabled device via a Bluetooth interface;
    requesting from the Bluetooth-enabled device via the Bluetooth interface the information requested by the contactless reader;
    receiving the information from the Bluetooth-enabled device via the Bluetooth interface; and
    relaying the information to the contactless reader.

14. The method of claim 13, wherein the information is payment information requested at a point of sale.

15. The method of claim 13, wherein the information is identification information requested by an access control system.

16. The method of claim 13, further comprising requiring and receiving authorization from a user of the Bluetooth-enabled device before divulging the information from the Bluetooth-enabled device.

17. A system for providing information to a contactless reader, comprising:
- a Bluetooth-enabled device; and
- a wireless translator, the wireless translator configured to receive a radio signal from a contactless reader wherein the radio signal comprises a request for information, to request the information from the Bluetooth-enabled device via a Bluetooth interface, to receive the information from the Bluetooth-enabled device, and to relay the information to the contactless reader.

18. The system of claim 17, wherein the wireless translator is affixed to the Bluetooth-enabled device.

19. The system of claim 17, wherein the wireless translator is inside of the Bluetooth-enabled device.

20. The system of claim 17, wherein the wireless translator comprises circuitry for performing radio communication, and a battery electrically connected to the circuitry and supplying power to the circuitry.

21. The system of claim 17, wherein the wireless translator comprises circuitry for performing radio communication, a battery, and a switch having two positions, and wherein when the switch is in the first position the circuitry does not draw power from the battery and when the switch is in the second position the circuitry draws power from the battery.

22. A system, comprising:
- a contactless reader;
- a Bluetooth-enabled device; and
- a wireless translator, the wireless translator comprising a first antenna configured for communication with the contactless reader, a second antenna configured for communication with the Bluetooth-enabled device via a Bluetooth interface, and circuitry operably coupled to both antennas, the circuitry configured to translate an information request from the contactless payment reader to the Bluetooth-enabled device, to receive the requested information from the Bluetooth-enabled device via the Bluetooth interface, and to relay the information to the contactless reader.

23. The system of claim 22, wherein the contactless reader is comprised in an access control system, and the requested information is identification information enabling access.

* * * * *